May 20, 1924.　　　　　　　　　　　　　　　　　　　1,494,768
R. R. BLOSS ET AL
WALKING BEAM FOR OIL, GAS, AND ARTESIAN WELLS
Filed Jan. 30 1922　　　3 Sheets-Sheet 1
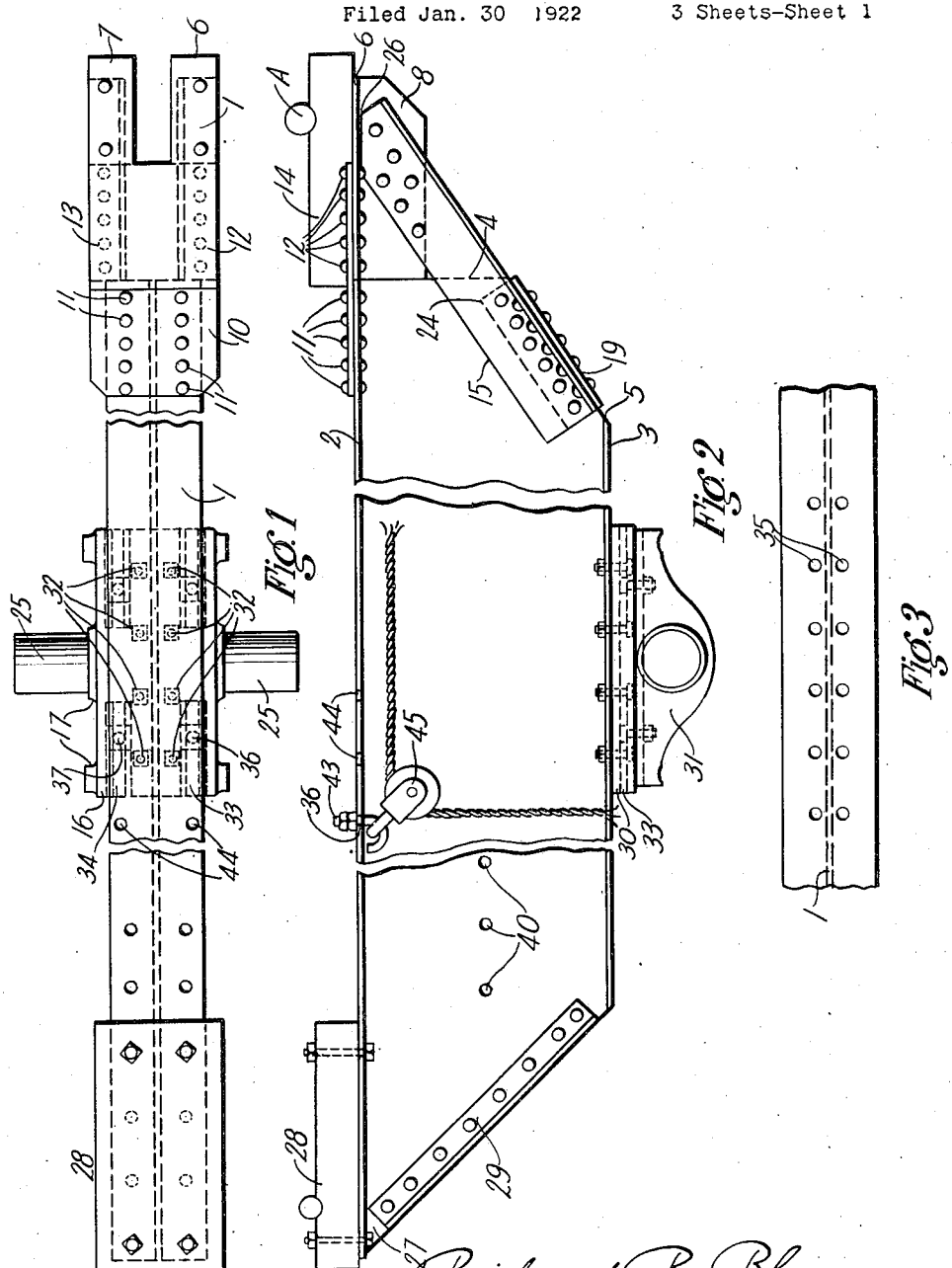

May 20, 1924.

R. R. BLOSS ET AL 1,494,768

WALKING BEAM FOR OIL, GAS, AND ARTESIAN WELLS

Filed Jan. 30 1922  3 Sheets-Sheet 2

Richard R. Bloss
William B. Tobin
INVENTOR.

BY

Edwin P. Corbett
ATTORNEY.

May 20, 1924.

R. R. BLOSS ET AL 1,494,768

WALKING BEAM FOR OIL, GAS, AND ARTESIAN WELLS

Filed Jan. 30 1922     3 Sheets-Sheet 3

Richard R. Bloss
William B. Tobin
INVENTOR.

BY

Edwin P. Corbett
ATTORNEY.

Patented May 20, 1924.

1,494,768

UNITED STATES PATENT OFFICE.

RICHARD R. BLOSS AND WILLIAM B. TOBIN, OF COLUMBUS, OHIO, ASSIGNORS TO THE INTERNATIONAL DERRICK AND EQUIPMENT COMPANY, OF COLUMBUS, OHIO, A CORPORATION OF OHIO.

WALKING BEAM FOR OIL, GAS, AND ARTESIAN WELLS.

Application filed January 30, 1922. Serial No. 532,842.

*To all whom it may concern:*

Be it known that we, RICHARD R. BLOSS and WILLIAM B. TOBIN, citizens of the United States of America, residing at Columbus, in the county of Franklin and State of Ohio, have invented certain new and useful Improvements in Walking Beams for Oil, Gas, and Artesian Wells, of which the following is a specification.

Our invention relates to walking-beams for oil, gas and artesian wells. Its aim is the provision of a structure that will adapt itself readily to any conditions which may exist and will be adjustable to meet all changing conditions as the operations progress.

In the past, although many forms of walking-beams have been in practical use, it has been customary to use either a beam of rectangular cross-section or one of a built-up section tapering in area toward the ends. The former structure presents the difficulty of requiring a maximum weight and size for the proper strength, while the latter, due to its tapered form, inevitably means a greater cost in manufacture. Furthermore, prior devices have been lacking in adjustability and even in uniform measurements, so that time is necessarily wasted in adjustment to meet new conditions or repair of parts in case of breakage.

One of the objects of our invention is to reduce the objectionable and unnecessary weight in proportion to strength, without a corresponding increase in manufacturing cost. This is accomplished by the use of an I-shaped cross-section of uniform area throughout the entire length of beam, which provision makes it possible to use standard structure I-beams. This design results in a great decrease in the ratio of weight to strength at a much less manufacturing cost than is possible with any built-up section.

Another object of our invention is the provision of an adjustable mechanism of such a character that the walking-beam may be adjusted to vary the fulcrum thereof without varying either the length of the power arm or the length of the weight arm or adjustment may be made that will vary the relative lengths of these arms. In conjunction with this, we have provided an adjustable counter weight that makes possible the offsetting of undesirable differences between the power arm and the weight arm or that may be utilized to facilitate the handling of the walking-beam during the unhitching of the drilling tools preparatory to removing them from the hole being drilled.

A further object of our invention is the provision of a saddle structure that is not only adjustable to facilitate the changing of the fulcrum and varying the relative lengths of the power and weight arms of the walking-beam but that is also provided with means of connection to the walking-beam of such a nature as to make possible the application to such beam of any make of saddle of typical design. This structure is such as to give any such saddle a double longitudinal to give any such saddle a double longitudinal adjustment or a transverse adjustment with respect to the walking-beam proper.

A still further feature of our invention contemplates the provision of a temper screw counterweight structure wherein the anchor hook for the temper screw counter weight pulley is made adjustable to correspond with adjustments of the saddle structure. The result of this is the obviation of too great a "jiggling" action of this counterweight.

Other important features of our walking-beam structure will appear as this description progresses. The preferred embodiment of our invention is shown in the accompanying drawings wherein similar characters of reference designate corresponding parts and wherein:

Figure 1 is a plan view of our walking-beam structure, showing the pitman-rod and temper screw blocks in place, and also showing in dotted lines the T-slot connection for securing the saddle to the saddle plate.

Figure 2 is a side elevation of the structure shown in Figure 1, and showing the method of reenforcing the slotted temper screw end of the walking-beam.

Figure 3 is a bottom fragmentary plan view of the walking-beam with the saddle and saddle plate removed.

Figure 7:
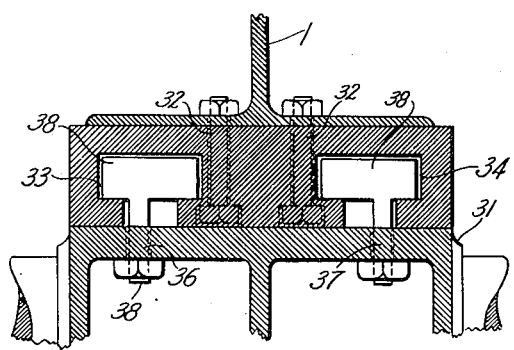
Figure 7 is a vertical cross-section taken through the bolt and slot structure of our saddle and saddle plate and showing the position of our eccentric bolts in the attachment of a saddle whose securing holes are spaced further apart than are the holes in the saddle shown in Figure 6.

In the drawings, our walking-beam is shown as comprising a light but very strong single unit and so designed in shape that it combines maximum strength with weight. This unit preferably takes the form of a standard wide-flanged Bethlehem I-beam with its ends cut away to suitable form and braced to ample rigidity and strength.

Figure 6:
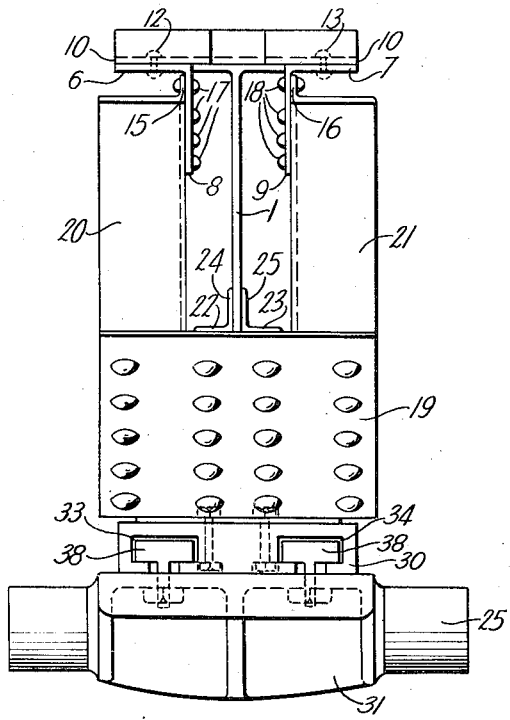
Figure 6 is an end elevation of the structure shown in Figures 1 and 2 with the saddle held in extended position by the disposition of the bolts with their shoulders centered.

This I-beam is best shown in Figures 1, 2 and 6 where it is designated 1. The right end of this beam 1 is of tapered form, while its left end is also of tapered form. This right end is properly called the temper screw end and the left end is properly called the pitman end.

The I-beam 1 is formed in the usual manner with a central web and with upper and lower flanges 2 and 3 respectively. The right or temper screw end of this I-beam is cut off squarely downwardly from its upper surface to something over one-half its depth as at 4. Then, it is undercut as at 5, forming an inclined edge, from the lower end of the vertical edge to the lower flange.

The end which has been thus cut off is provided with a supplemental structure comprising outwardly turned angle irons having horizontal legs 6 and 7. (See Figure 6.) These angle irons are spaced from each other and have their upper horizontal legs disposed in the same horizontal plane as the flange 2 of the main angle iron, the desirable thing being that the upper surface of these horizontal legs shall be in the same plane as the upper surface of the flange 2 of the main I-beam. The vertical legs of these angle irons may be designated 8 and 9 and reference to Figure 6 will show that these legs 8 and 9 are sufficiently spaced to provide a bifurcate structure within and upon which the temper screw structure is supported. Superimposed upon the abutting ends of the flange 2 and the horizontal legs 6 and 7 of the angle irons just described is a plate 10 that is riveted as at 11 to the flange 2 of the main I-beam and that is riveted as at 12 and 13 to the horizontal legs 6 and 7 of the angle irons. This structure preferably serves as a support for a bifurcate block 14 or for other bearing means for temper screw A.

The angle irons having the legs 6, 7, 8 and 9 are braced adjacent their outer ends by means of inclined angle irons immediately exterior to the vertical legs 8 and 9. These bracing angle irons have vertical legs 15 and 16 which are riveted to the legs 8 and 9 of the horizontally disposed angle irons by rivets 17 and 18. These angle irons extend inwardly toward the longitudinal center of the I-beam and into straddling but spaced relation with the undercut web of the same. They are rigidly held in this spaced relation by a plate 19 to which their legs 20 and 21 are riveted and this plate 19 is in turn riveted to legs 22 and 23 of angle irons whose legs 24 and 25 are in turn riveted to the web of the I-beam. The legs 15 and 16 of the inclined angle irons are cut off as at 26 in Figure 2. It will be apparent that these angle irons serve to resist any downward strains upon the slotted extension and to absolutely prevent any bending or breaking loose of the added structure. The slotted end structure thus far described provides a means whereby any down-force on the temper screw is divided into two component forces. One of these components acts along the horizontal upper flange of the main I-beam and the other component along the diagonal bracing angle to the web of the main I-beam, the force in the upper flange appearing as tension and in the inclined angles as compression.

The opposite or pitman end of the walking-beam is generally designated 27 and is shown undercut to produce a tapered end formation. It is provided with a pitman stirrup bearing or block 28. It is also desirably reinforced by means of angle irons 29, extending from flange to flange as shown in Figure 2.

Figure 8:
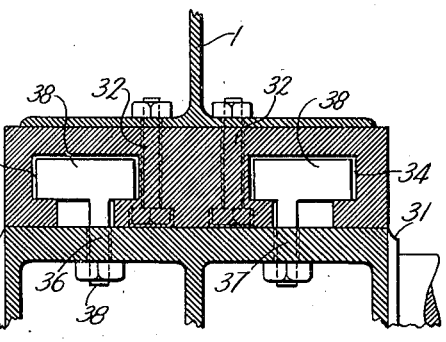
Figure 8 is a vertical cross-section similar to Figure 7 but showing the position of our eccentric bolts in the attachment of a saddle whose securing holes are nearer together than are the holes shown in Figure 6.

Adapted to be bolted near the center of the walking-beam and to be supported by the lower flange 3 thereof, we have provided a saddle plate 30 which is shown in cooperation with a saddle 31 of standard make. This saddle plate 30 is provided with a series of equally spaced bolt holes 32, preferably arranged near and on each side of its longitudinal center. It is also provided with T-slots 33 and 34, the shank of each T-slot extending vertically through the base of the saddle plate, as best shown in Figures 6, 7 and 8. The lower flange 3 of the I-beam 1 is provided with a series of spaced holes 35 intermediate the length of the beam and on each side of the web thereof. Bolts placed in the holes 32 of the saddle plate and extending through the holes 35 of the I-beam will secure this saddle plate to the flange 3 of the I-beam and by means of the plurality of equally spaced holes 35 it will be possible to adjust the saddle plate longitudinally upon the walking beam.

The saddle 31 is preferably of standard construction, being provided with four bolt holes, as at 36 and 37. Theoretically, the centers of these bolt holes form the corners of a perfect parallelogram but, in practice they are usually disposed with relation to each other, sometimes in one direction and sometimes in another. Obviously, this makes it impossible to provide four fixed bolt holes in the walking-beam for the reception of the bolts of these standard saddles.

Figure 4:
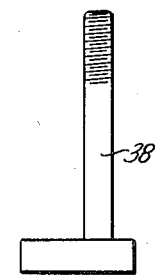
Figure 4 is a detail view of a special eccentric bolt, showing the offset position of the shank.
Figure 5:
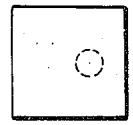
Figure 5 is an end view of the eccentric bolt shown in Figure 4, and illustrating the rectangular head and the position of the shank thereon.

In order that the saddle plate 30 will be adapted to receive a saddle of a standard make, regardless of the normal variation in the distance between hole centers, we have provided eccentric bolts 38, in that the shanks of the bolts are offset relative to the centers of the bolt heads which are preferably rectangular in contour. This is best shown in Figures 4 and 5.

Referring to Figures 4, 5, 6, 7 and 8, it will be noted that the saddle 31 is secured to the saddle plate 30 by means of these eccentric bolts 38 working in the T-slots 33 and 34 and through the bolt holes 36 and 37. It will be understood that the bolts are removable from their slots when adjustment is desired and it will be noted that they are shown in Figure 6 with their heads so mounted in the slots that their shanks are centered in the slot shanks. Then, by reference to Figure 7, it will be apparent that the bolts have been removed and replaced so that the bolt shanks are disposed adjacent the outer edge of the slot shanks, whereas in Figure 8 the bolts have been removed and replaced so that the bolt shanks are adjacent the inner edge of the slot shanks. Thus, it will be obvious that these bolts are adjustable to accommodate and facilitate adjustment of any saddle of standard make with all possible variation in distance between hole centers. It will furthermore be obvious that the bolts make possible the adjustment of the saddle either longitudinally or transversely of the I-beam and saddle plate in addition to the longitudinal adjustment afforded by the series of holes 35 in the lower flange 3 of the I-beam.

By way of recapitulation, an examination of the structure just described will make it apparent that three capabilities of adjustment are provided. The saddle plate may be adjusted along the I-beam by means of the bolt holes 35. The saddle may be adjusted along the saddle plate by means of bolts along the T-slots 33 and 34 and the saddle may be adjusted either longitudinally or transversely by removal, partial rotation and replacement of the bolts in their slots.

Figure 9:
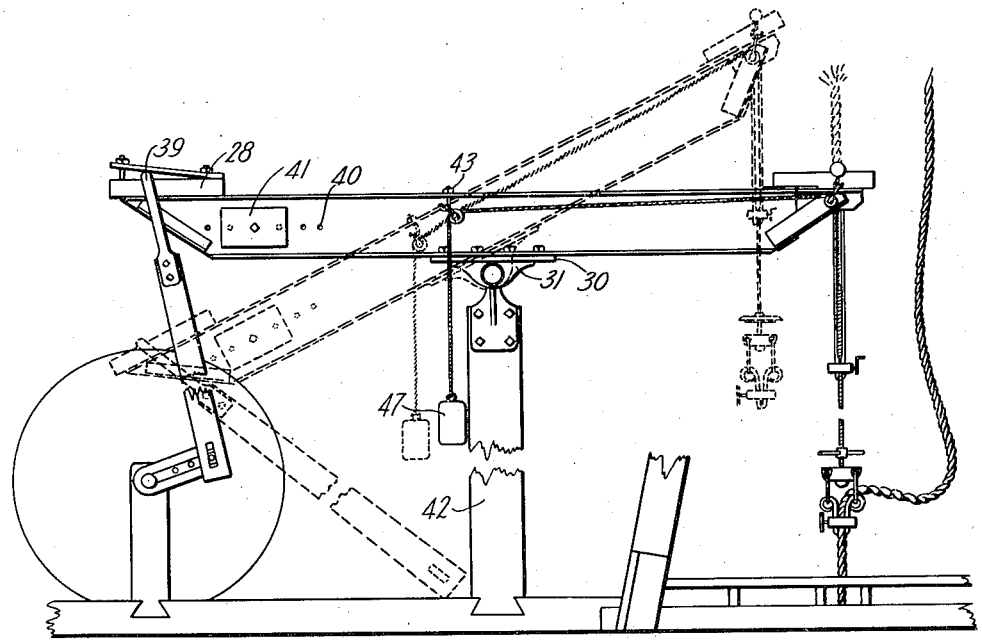
Figure 9 is a diagrammatic view of a portion of a crank side elevation of a typical drilling rig illustrating the fulcrum in one position and showing in dotted lines the utility of our adjustable counter weight in removing the pitman from the crank preparatory to removing the tools from the hole.
Figures 10, 11:
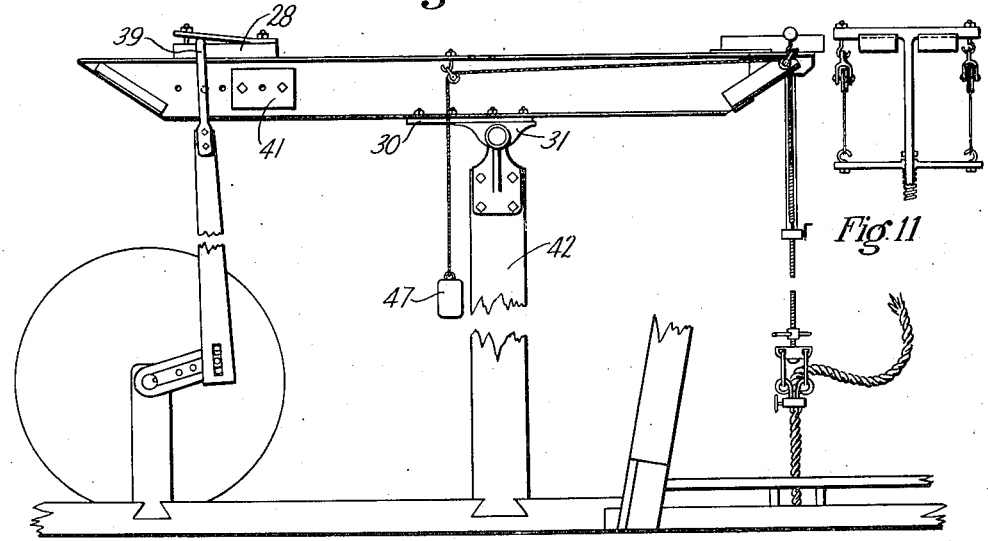
Figure 10 is a view similar to Figure 9 showing the use of our apparatus in drilling a well wherein the distance from the sampson post to the hole being drilled is less than the similar distance under conditions represented by Figure 9 but wherein adjustments have been made to correspondingly shorten the power arm and proportion the balance by movement of counted weight.
Figure 11 is an end elevation of the temper screw supporting structure.

Referring more particularly to Figures 9 and 10, it will be apparent that our adjustable saddle structure paves the way for other important adjustments. Our novel saddle structure, being adjustable along the beam, makes possible the ready adjustment of the length of the weight arm of the beam to accommodate our structure to rigs wherein the distance to the sampson post to the hole being drilled is different. It is possible in our structure to vary the length of either or both the power arm and the weight arm. This adjustment can be accomplished in such a manner as will maintain a fixed relationship between these two lengths; or both may be increased or decreased in different degrees. This is illustrated in part by Figures 9 and 10.

The structure for accomplishing this, in addition to the adjustable saddle, comprises the pitman stirrup 39 which may be adjusted with the pitman bearing block 28. It also comprises counter weight holes 40 and a counter weight 41. The sampson post may be designated 42.

By comparison of Figures 9 and 10, it will be seen that the weight arm has been shortened by adjustment of the saddle while the power arm has been correspondingly shortened by adjustment of the pitman stirrup and its bearing block along the walking beam. This, in itself, tends to produce a balanced condition.

However, we have provided the counter weight holes 40 and the counter weight 41 so that we may obtain practically any reasonable condition of balance desired. The counter weight is preferably so mounted as to produce such a condition of balance that when it is desired to remove the tools from the hole, the pitman can be detached from the crank-pin and moved to the position shown in dotted lines in Fig. 9 with slight effort, due to the fact that the counter weight will serve to assist the operator in moving the pitman end of the walking-beam downwardly against the weight on the temper screw end. It is also important to note that our beam is cutaway at the temper screw end at a sufficient angle to ensure that the temper screw structure will hang vertically when the power arm moves to the dotted line position of Figure 9 for removal of the tools. It will likewise be apparent that the cutaway nature of the pitman end will facilitate the reception of a wide range of stirrup lengths.

A further feature of our invention has to do with the provision of the adjustable hooks 43 which may be placed in any of the holes 44 in the upper flange of the I-beam. These hooks 43 support the pulley 45 over which run the counter weight ropes 46 which are connected at one end to the temper screw and at the other end to a counter weight 47. The adjustment of these pulley hooks 43 bears a cooperative relation to the adjustment of the saddle structure. It is a desirable thing to maintain the position of these counter weight pulleys as near the fulcrum, as possible, for this diminishes constant jiggling of the counter weight. It will be obvious that this structure permits of this adjustment and, consequently, largely obviates this undesirable tendency.

Having thus described our invention, what we claim is:

1. A walking-beam structure for oil, gas and artesian wells comprising an I-beam formation with a slotted end.

2. A walking-beam structure for oil, gas and artesian wells comprising an I-beam structure with a slotted tapered end.

3. A walking-beam structure for oil, gas and artesian wells comprising an I-beam structure with both ends undercut and with one end slotted.

4. A walking-beam structure for oil, gas and artesian wells comprising an I-beam formation, and fabricated to form a temper screw support on one end thereof adapted to distribute the stresses to a flange of the I-beam and also to the web thereof.

5. A walking-beam structure for oil, gas and artesian wells comprising an I-beam formation and a temper screw support on one end thereof having a substantially triangular form with one leg connected to a flange of the I-beam and another leg connected to the web thereof.

6. A walking-beam structure for oil, gas and artesian wells comprising an I-beam formation, and a temper screw support on one end thereof having a structure to directly resist weight stresses by tension upon a flange of the I-beam and compression upon the I-beam web.

7. A walking-beam structure for oil, gas and artesian wells comprising an I-beam formation, a temper screw support on one end thereof having a structure to directly resist weight stresses by tension upon a flange of the I-beam and compression upon the I-beam web and having a slot in said support.

8. Walking-beam structure for oil, gas and artesian wells comprising means for altering the length of either the power arm or weight arm of said walking beam.

9. Walking beam structure for oil, gas and artesian wells comprising means for independently altering the length of both the power arm and weight arm of said walking beam.

10. Walking-beam structure for oil, gas and artesian wells comprising a main beam member and a saddle connected thereto in a manner to permit longitudinal and lateral adjustment.

11. Walking beam structure for oil, gas and artesian wells comprising a main beam member, and a saddle longitudinally and laterally adjustable with relation to said beam.

12. Walking-beam structure for oil, gas and artesian wells comprising a main beam member, and a saddle laterally adjustable with relation to said beam.

13. Walking-beam structure for oil, gas and artesian wells comprising a main beam, and means for attaching various saddles thereto regardless of variable distances between the holes of said saddle.

14. Walking-beam structure for oil, gas and artesian wells comprising a main beam and eccentric bolts adjustable for attaching various saddles with differently spaced holes to said beam.

15. Walking-beam structure for oil, gas and artesian wells comprising a main beam, a slotted saddle plate, bolts adjustably mounted in the slots of said saddle plate, and a saddle to be secured in place by said bolts.

16. Walking-beam structure for oil, gas and artesian wells comprising a main beam, a slotted saddle plate, eccentric bolts adjustably mounted in the slots of said saddle plate, and a sadddle to be secured in place by said bolts.

17. Walking-beam structure for oil, gas and artesian wells comprising a main beam, a saddle plate with slots therein, and eccentric saddle-securing bolts whose heads are retained in such slots and removable for rotative adjustment.

18. Walking beam structure for oil, gas and artesian wells comprising a main beam, means for varying the lengths of either the power or weight arms, and adjustable means for the reception of a counterweight on said beam.

19. Walking-beam structure for oil, gas and artesian wells comprising a main beam, a temper screw counterweight, an adjustable saddle structure, a pulley for said counterweight, and a support for said pulley adjustable to compensate for adjustments of said saddle.

20. Walking-beam structure for oil, gas and artesian wells comprising a main beam, a temper screw counterweight, a pulley and an adjustable support for said pulley.

21. A walking-beam comprising a wide-flanged I-beam and a saddle adjustably secured thereto, one end of said walking-beam being formed with a reenforcing on each side of its web and extending from flange to flange.

22. A walking-beam comprising an I-beam, an angle secured to each side of the web at one end of the I-beam, an extension secured to the other end of the I-beam comprising two angles spaced to form a vertical slot and two angles secured to the I-beam and to said extension angle.

23. A walking-beam comprising a structural-steel body, a saddle plate adjustably connected thereto and a saddle adjustably secured to said saddle plate.

24. A walking-beam comprising an I-beam, a temper screw slot, means for reenforcing said slot and an adjustable means secured to said I-beam for receiving saddles of varying designs.

25. A walking-beam comprising an I-beam, a saddle plate adjustably mounted thereon, and a saddle adapted to be secured to said plate, said plate containing means whereby the saddle may be adjusted to substantially any position with respect to said plate.

26. Walking-beam structure for oil, gas or artesian wells comprising a saddle, a saddle plate and means for adjusting either the saddle or said plate to vary the fulcrum of the walking beam.

27. Walking-beam structure for oil, gas and artesian wells comprising means for adjusting the fulcrum of said beam and means for adjustably counterweighting said beam.

28. A walking-beam comprising an I-beam structure, a temper screw slot in one end of one flange of said I-beam and an adjustable saddle secured to said I-beam.

29. A walking-beam comprising an I-beam structure, a temper screw slot in one end of one flange of said I-beam, reinforcing means for strengthening said slot, and an adjustable saddle secured to said I-beam.

In testimony whereof we hereunto affix our signatures.

RICHARD R. BLOSS.
WILLIAM B. TOBIN.